United States Patent [19]
Perella

[11] Patent Number: 5,789,702
[45] Date of Patent: Aug. 4, 1998

[54] MODULAR COMPONENT OF APPLIANCE HOUSING

[76] Inventor: Paul Perella, 602 Waterford Dr., Pittsburgh, Pa. 15234

[21] Appl. No.: 650,043

[22] Filed: May 17, 1996

[51] Int. Cl.⁶ .................................................. H02G 3/10
[52] U.S. Cl. .................................................. 174/48; 220/327
[58] Field of Search ........................... 174/53, 52.1, 48; 220/3.2, 210

[56] References Cited

U.S. PATENT DOCUMENTS

| | | | |
|---|---|---|---|
| 3,402,954 | 9/1968 | Simon | 287/189.36 |
| 4,165,443 | 8/1979 | Figart et al. | 174/53 |
| 5,486,650 | 1/1996 | Yetter | 174/53 |

Primary Examiner—Hyung S. Sough
Assistant Examiner—Joseph Waks
Attorney, Agent, or Firm—John D. Gugliotta

[57] ABSTRACT

An enclosure module is provided for use in holding a variety of components or functioning as an appliance housing. The module is square in shape, and has a bottom backplate circumscribed at its perimeter by four identical sidewalls extending outward therefrom. Each sidewall forms a wireway opening at a point about the central axis of the module, and supports both a shallow alignment boss to one side of the central axis and a shallow alignment slot. Both the alignment boss and the alignment slot are vertically placed, are at equal heights, and are placed equidistant from the central axis. In such a configuration it is intended that when two identical enclosure modules are placed adjacent, the alignment boss of a first module will align with engage to the alignment slot of a second, adjacent module such that the wireway openings become aligned in a mutually accessible manner.

7 Claims, 13 Drawing Sheets

REAR VIEW OF FACEPLATE 5,789,702

1

MODULAR COMPONENT OF APPLIANCE HOUSING

FIELD OF THE INVENTION

The present invention relates generally to component or appliance housings and, more particularly, to a modular enclosure which can be utilized to house a variety of components, appliances, and/or faceplates in a modular, interconnectable and interchangeable manner.

BACKGROUND OF THE INVENTION

Many configurations for appliance or component housings are known. In general, the functionality of such housings is for containment and support. Also, the design of such housings is usually meant for some aesthetic benefit of one sort or another. However, it is unknown in the art of combining the aesthetic design along with the functionality in order to achieve an entire system of component housings which interlock for the purposes of interrelated aesthetic interaction.

BRIEF SUMMARY OF THE INVENTION

The general purpose of the current invention is to provide an improved housing for either electronic components or appliances, such as radios, clocks, visual displays, and the like.

It is a specific object of the present invention to provide such housings that are modular, and thereby interchangeable.

It is a further object of the present invention to provide such housings that are interconnectable into a system or array of such housings.

It is a further object of the present invention to provide such housings that accommodate wireway openings for allowing the passage of cables out from the enclosure.

It is a further object of the present invention to provide such housing wireways that provide for sufficient access for passing cables terminated by electrical plugs or electrical jacks.

It is yet a further object of the present invention to provide such housings having mounting holes keyed to be affixed onto standard electrical outlets or wall boxes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

2

Figure 3:
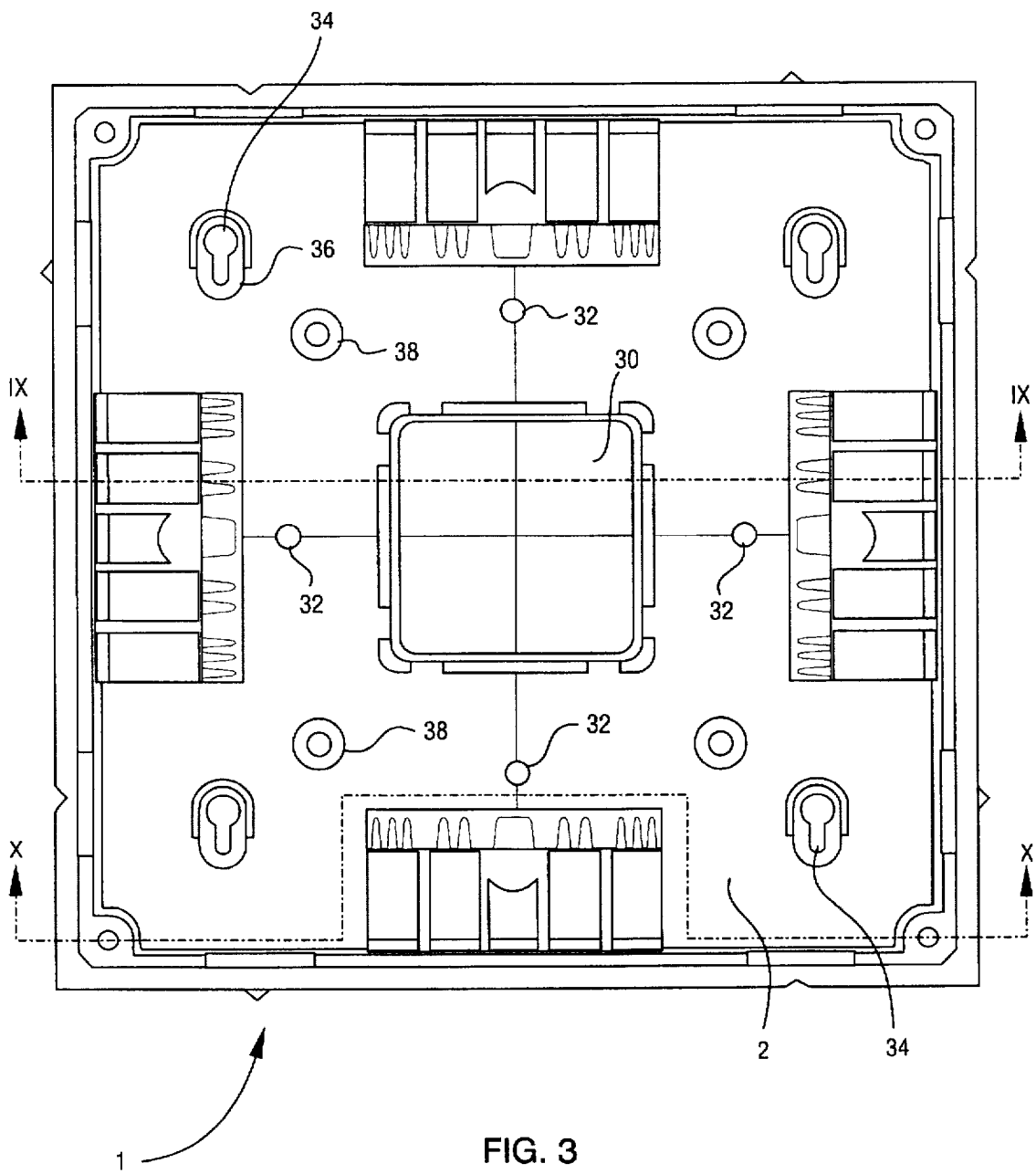
FIG. 3 is a top plan view of a panel module enclosure according to the preferred embodiment of the present invention.
Figure 8:
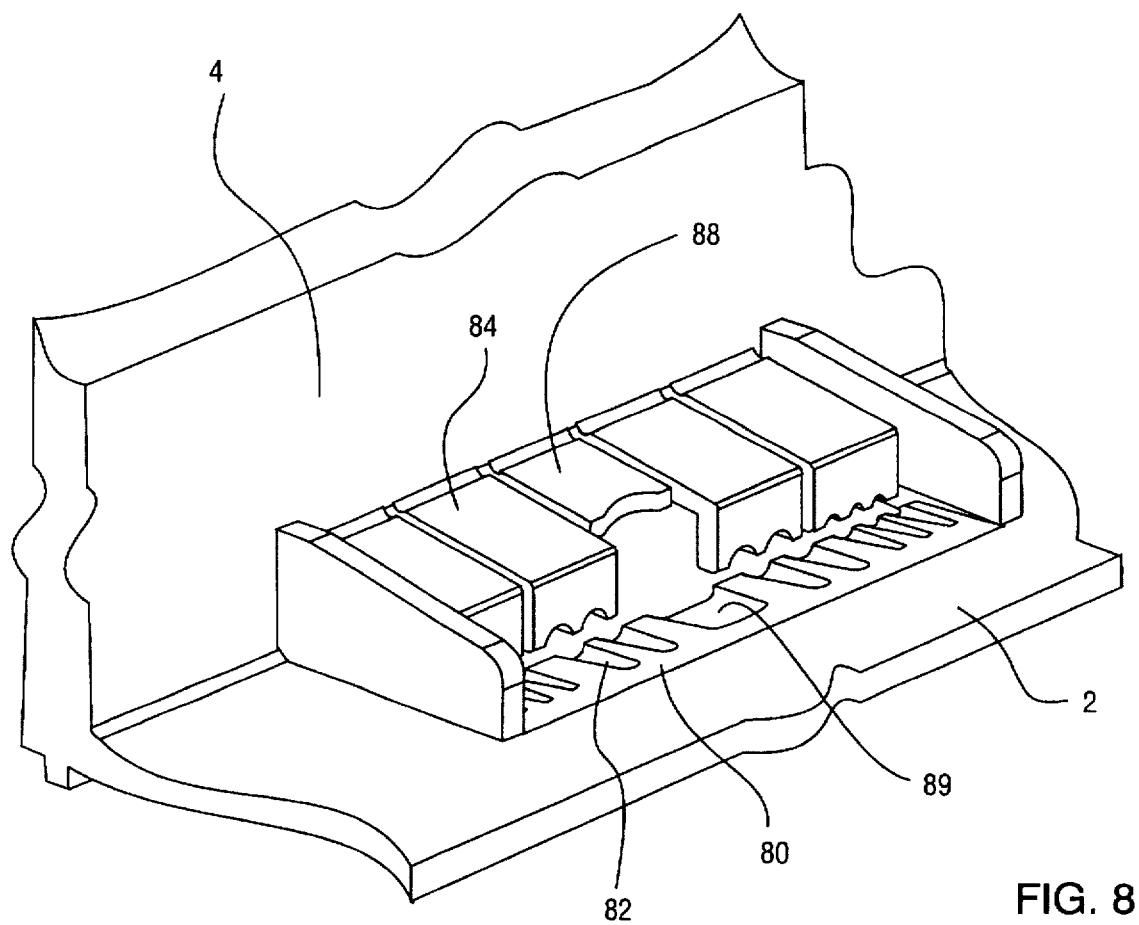
Figure 9:
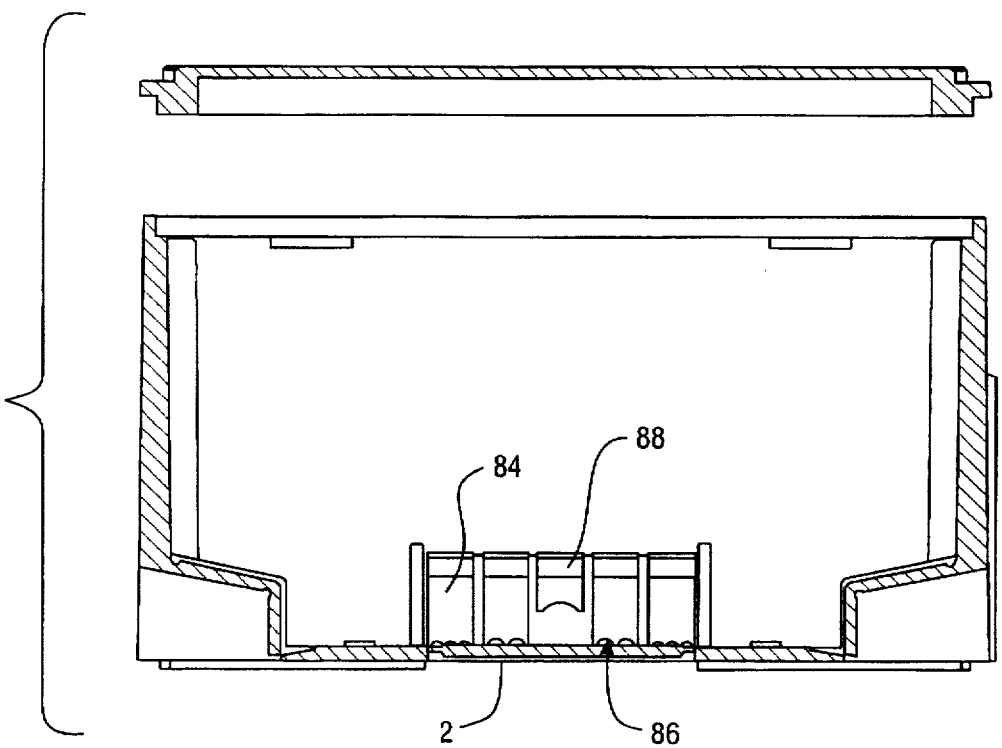
Figure 10:
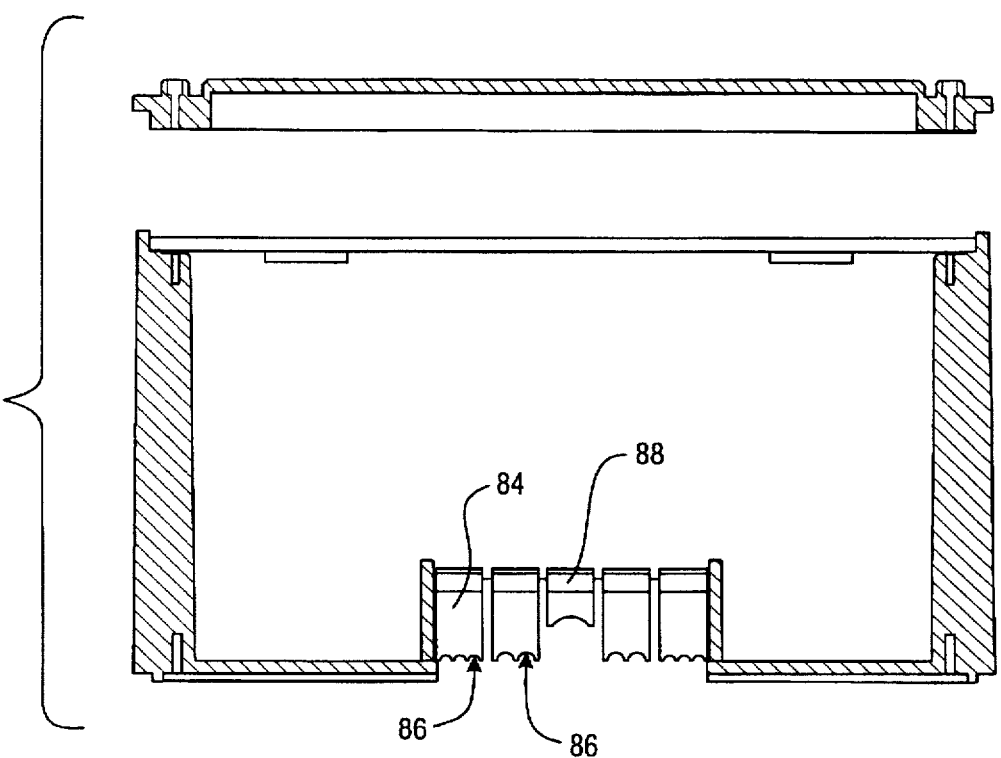
Figure 11:
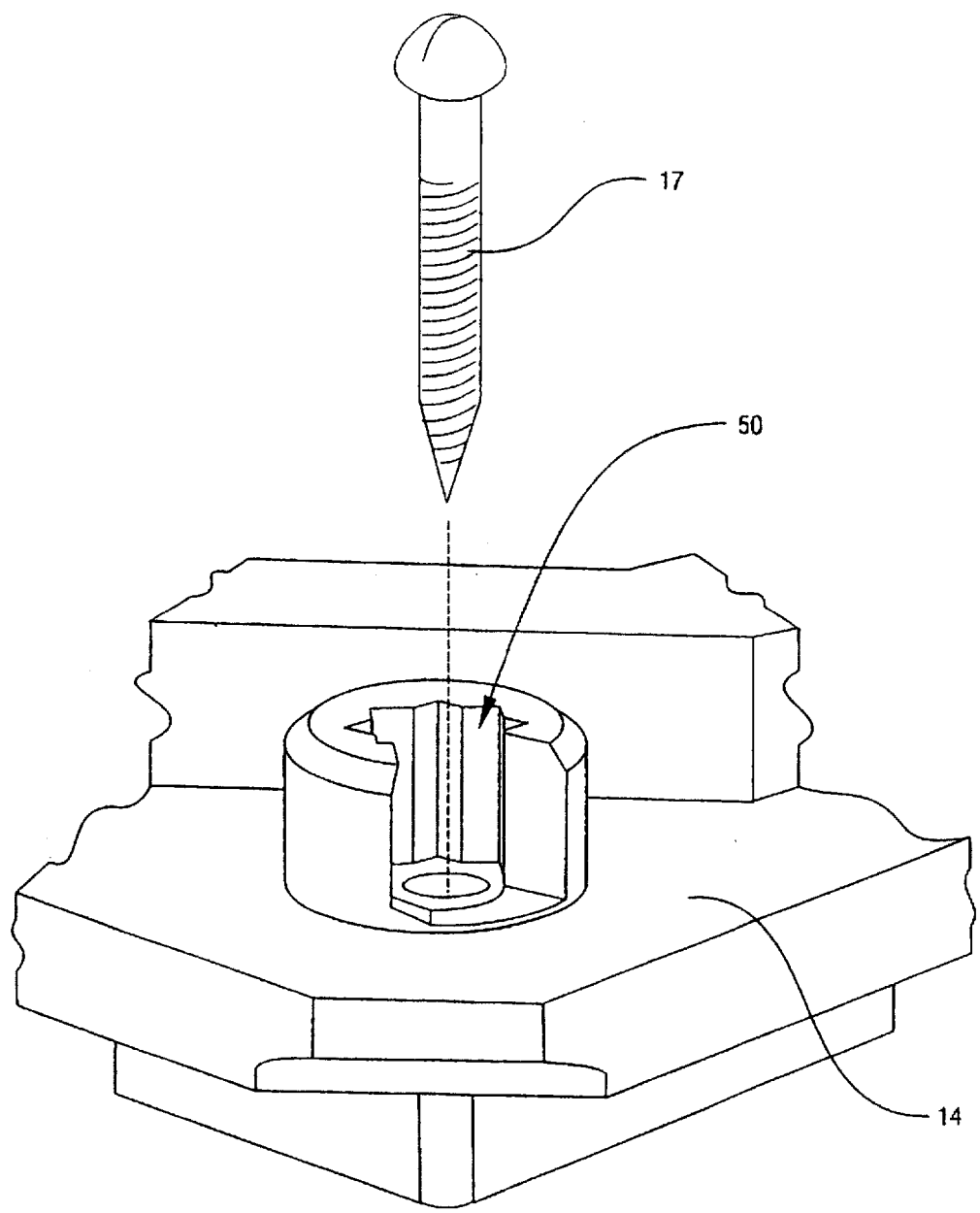
Figure 12:
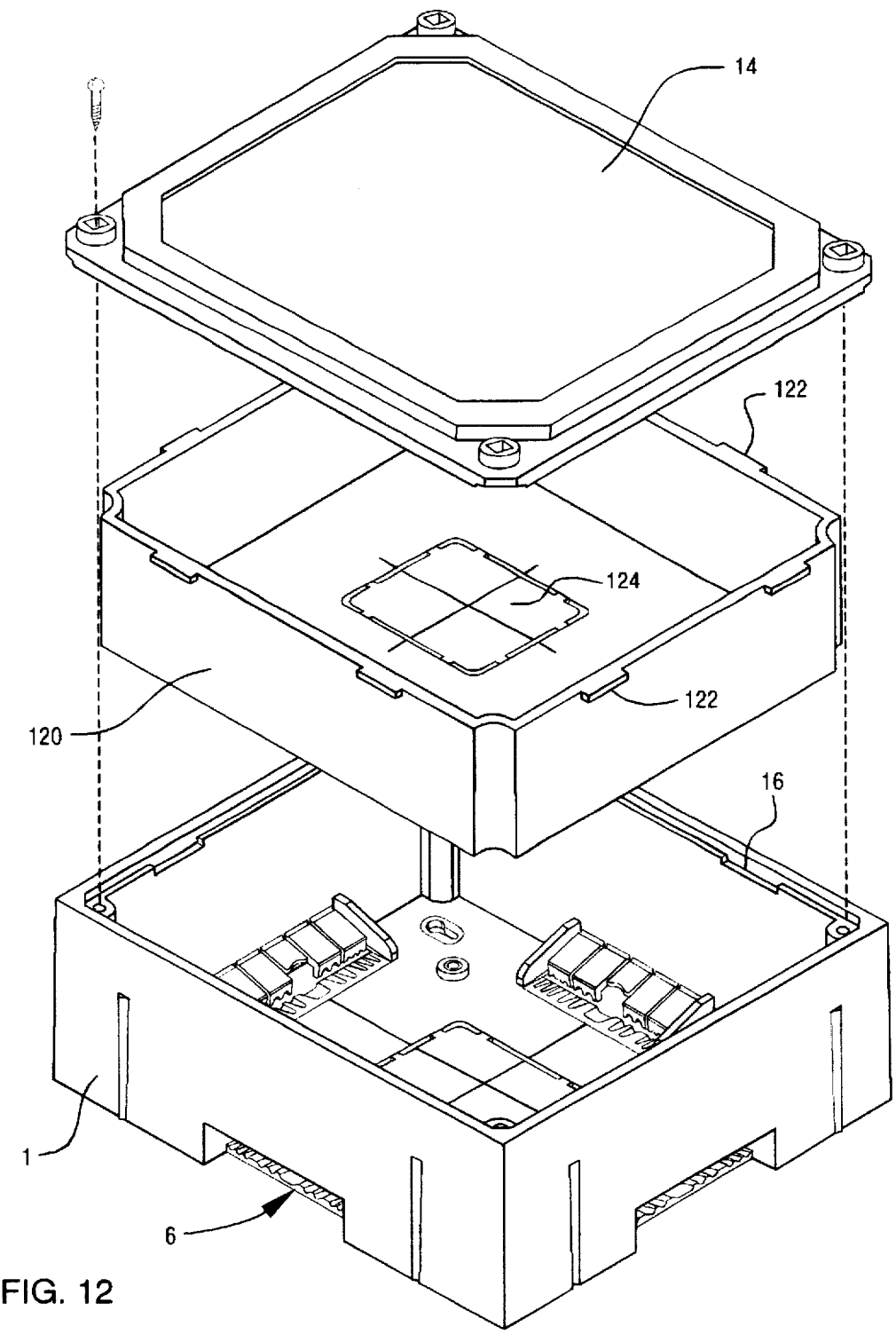
Figure 13:
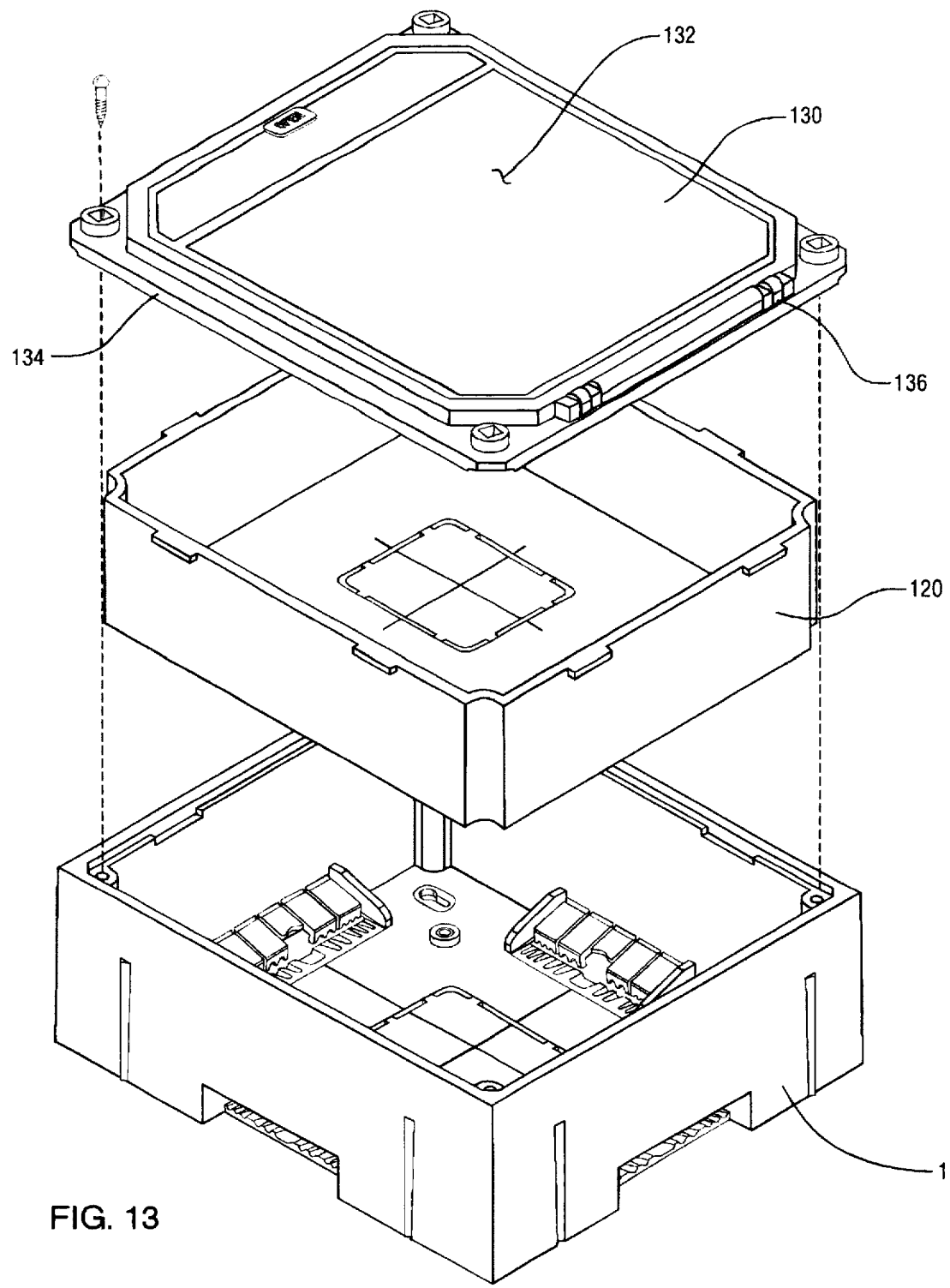
Figures 14, 14A:
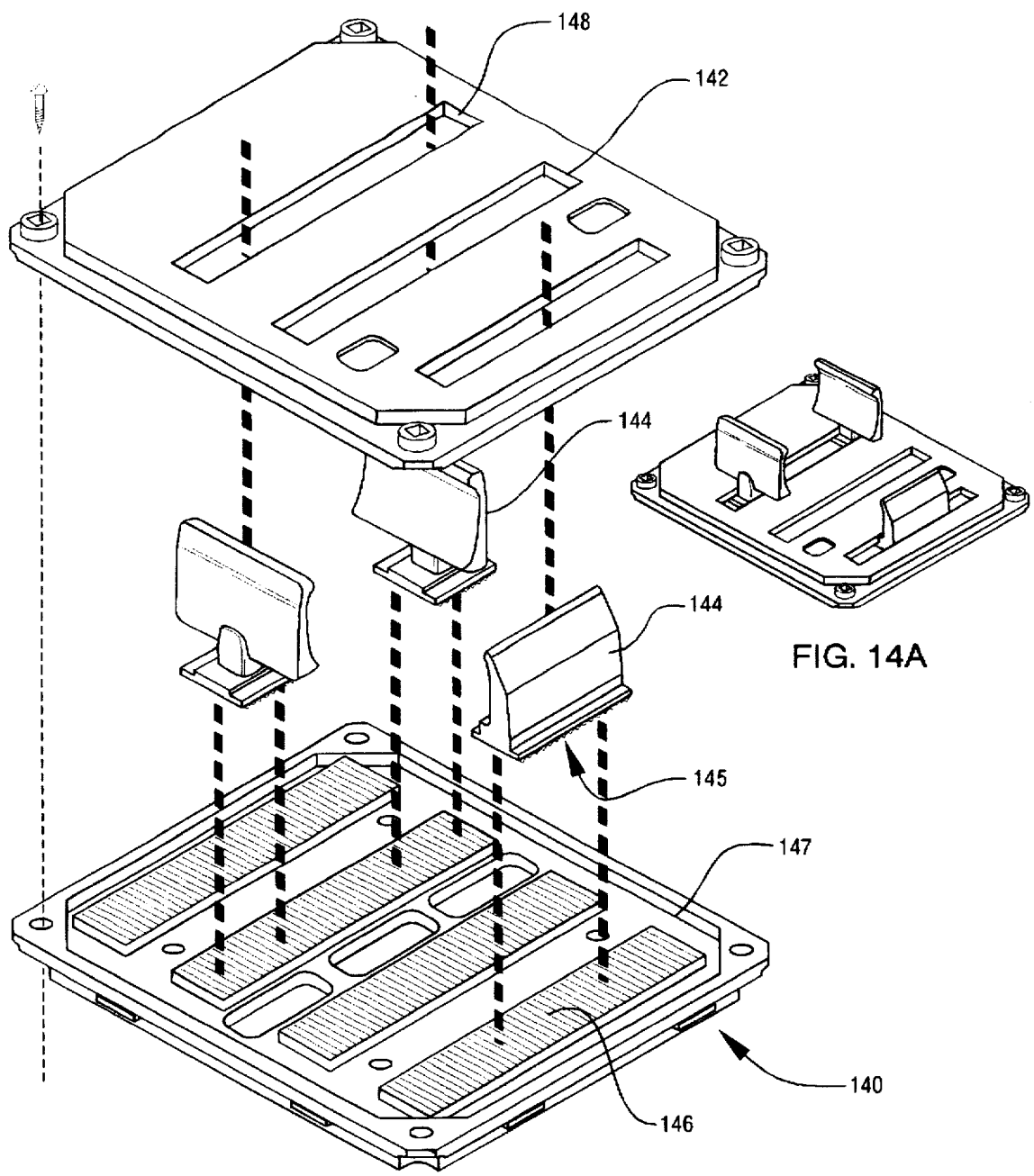

FIG. 8 is a partial exploded detailed view of a wireway opening located within the enclosure;

FIG. 9 is a cross sectional side elevation taken along line IX—IX as shown in FIG. 3;

FIG. 10 Is a cross sectional side elevation taken along line X—X as shown in FIG. 3;

FIG. 11 is a partial exploded detailed view of a screw fastener with mounting holes provided at each corner of a faceplate cover;

FIG. 12 is an orthographic view depicting an optional accessory tray mounted between the housing and cover plate;

FIG. 13 is an orthographic view depicting the optional accessory tray mounted between the housing and cover plate as shown in FIG. 11 utilizing an alternate hinged cover plate;

FIG. 14 is an exploded orthographic view of an adjustable surface mounted clamping means for use with the present invention; and FIG. 14a is an orthographic view the adjustable surface mounted clamping means in an assembled condition.

DETAILED DESCRIPTION OF THE PREFERRED EMBODIMENT

Figure 1:
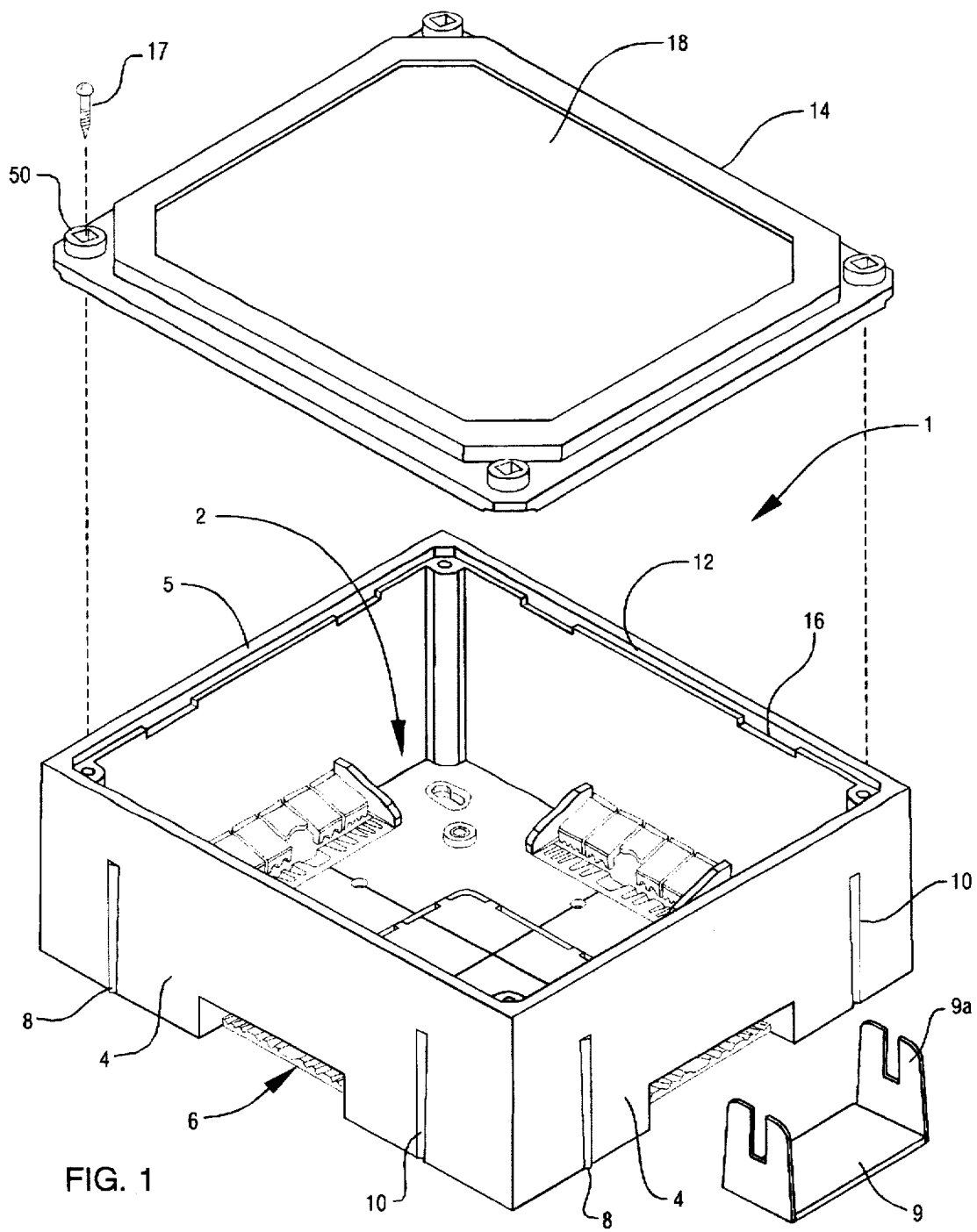
FIG. 1 is an isometric view of the preferred embodiment of the present invention shown herein with a generic cover plate.
Figure 5:
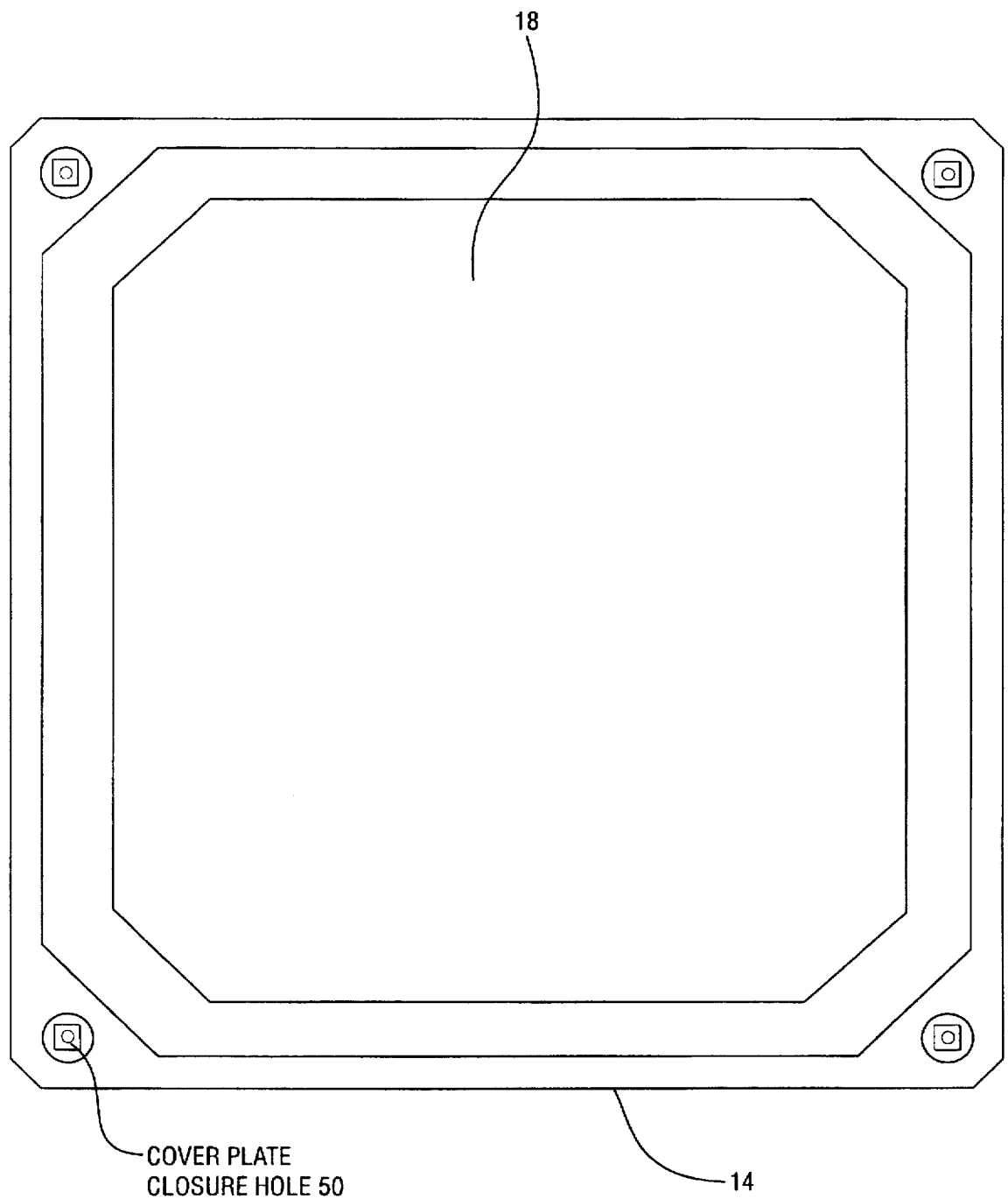
FIG. 5 is a top plan view of the generic cover plate as shown in FIG. 1.
Figure 6:
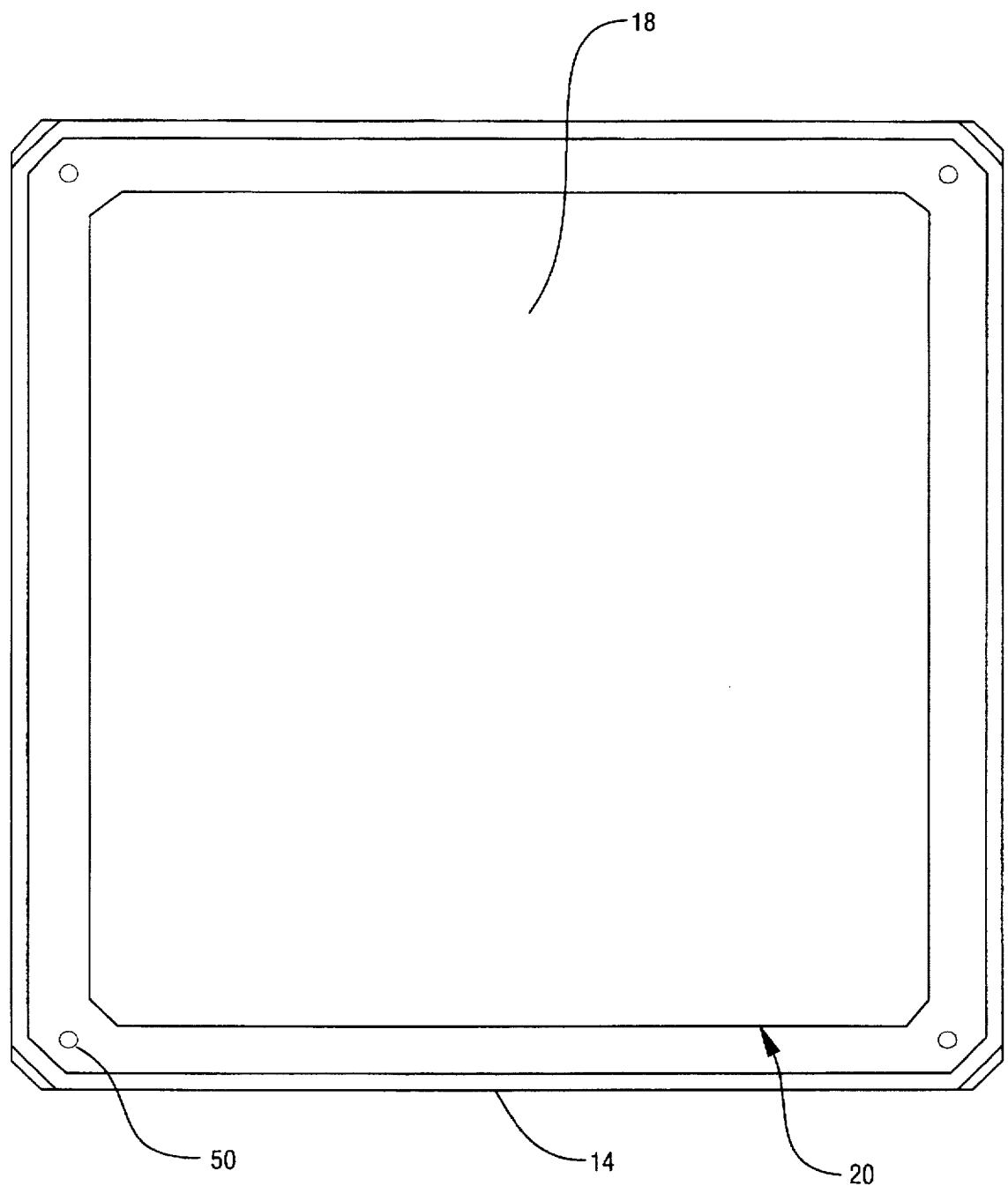
FIG. 6 is a bottom plan view thereof.
Figure 7:
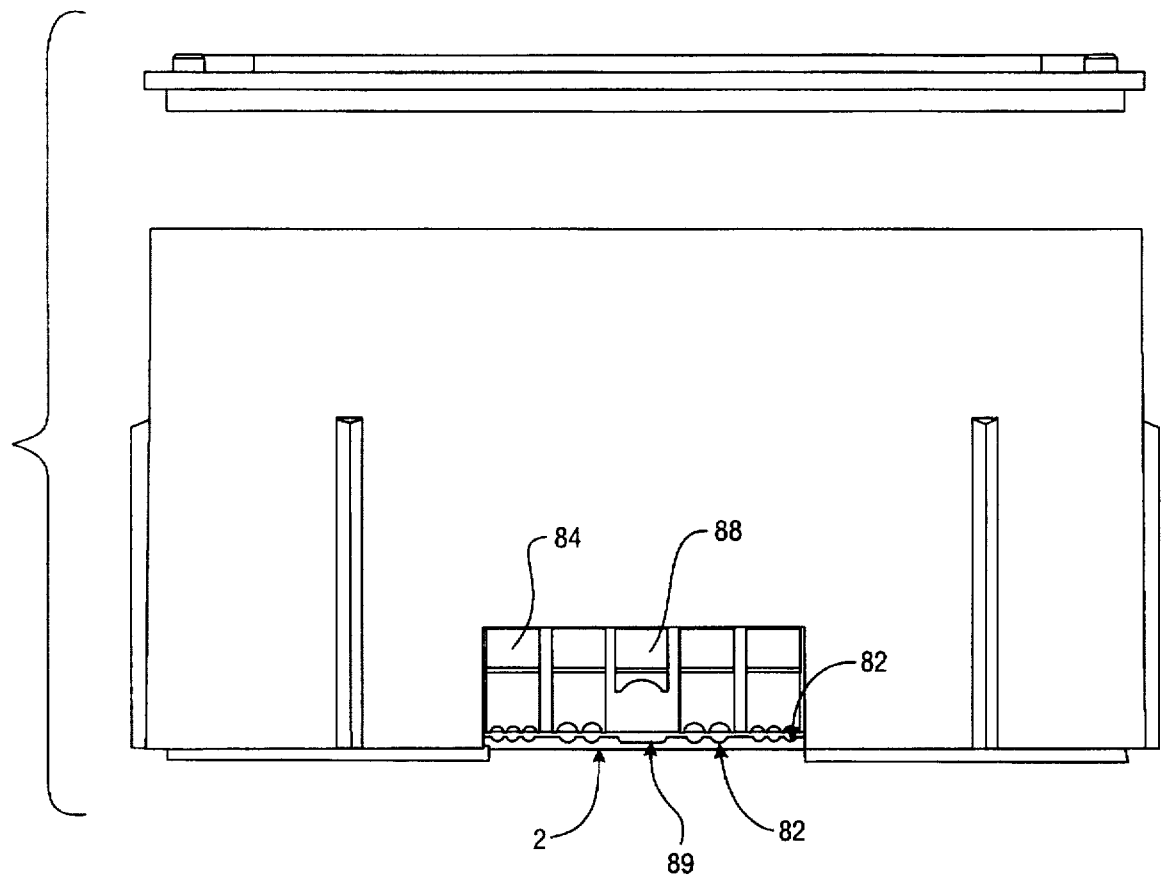
FIG. 7 is a side elevational view of the preferred embodiment of the present invention shown herein with a generic cover plate.

Referring now to the figures, FIG. 1 shows an enclosure module 1, according to the present invention, for use in holding a variety of components or functioning as an appliance housing. The module 1 is square in shape, and has a bottom backplate 2 circumscribed at its perimeter by four identical sidewalls 4 extending outward therefrom. Each sidewall 4 forms a wireway opening 6 at a point about the central axis of the module 1, and supports both a shallow alignment boss 8 to one side of the central axis and a shallow alignment slot 10. Both the alignment boss 8 and the alignment slot 10 are vertically placed, are at equal heights, and are placed equidistant from the central axis. In such a configuration it is intended that when two identical enclosure modules 1 are placed adjacent, the alignment boss 8 of a first module 1 will align with engage to the alignment slot 10 of a second, adjacent module 1 such that the wireway openings 6 become aligned in a mutually accessible manner. A clamp 9 can be optionally utilized to affix together such adjacent, aligned enclosure modules 1 by clamping between aligned wireway openings 6 and forming an impingement between parallel clamp forks 9a. Along the top edge 5 of each sidewall 4 is a faceplate seat 12 formed along the inner edge for receiving in a fitting manner a faceplate cover 14. Recessed within the faceplate seat 12 is also a plurality of accessory tray seat notches 16 for receiving and containing an accessory tray as is described below. As shown in FIG. 1, a generic faceplate cover 14 is shown for affixing to the enclosure module 1. Shown more clearly in conjunction with FIG. 5 and FIG. 6, each faceplate cover 14 fits over, covers, and seals the upper opening of the enclosure module 1 in a conventional manner, herein depicted as a screw fastener 17 partially penetrating a cover plate closure hole 50 formed at each corner of the cover 14. As shown, the generic faceplate cover 14 includes a front plate cover 18 forming a rigid barrier covering the internal volume of the enclosure module 1 when in place. At the back side of the front plate cover 18 is an engaging ridge 20 for aligning along the faceplate seat 12 in a sealing manner.

Figure 2:
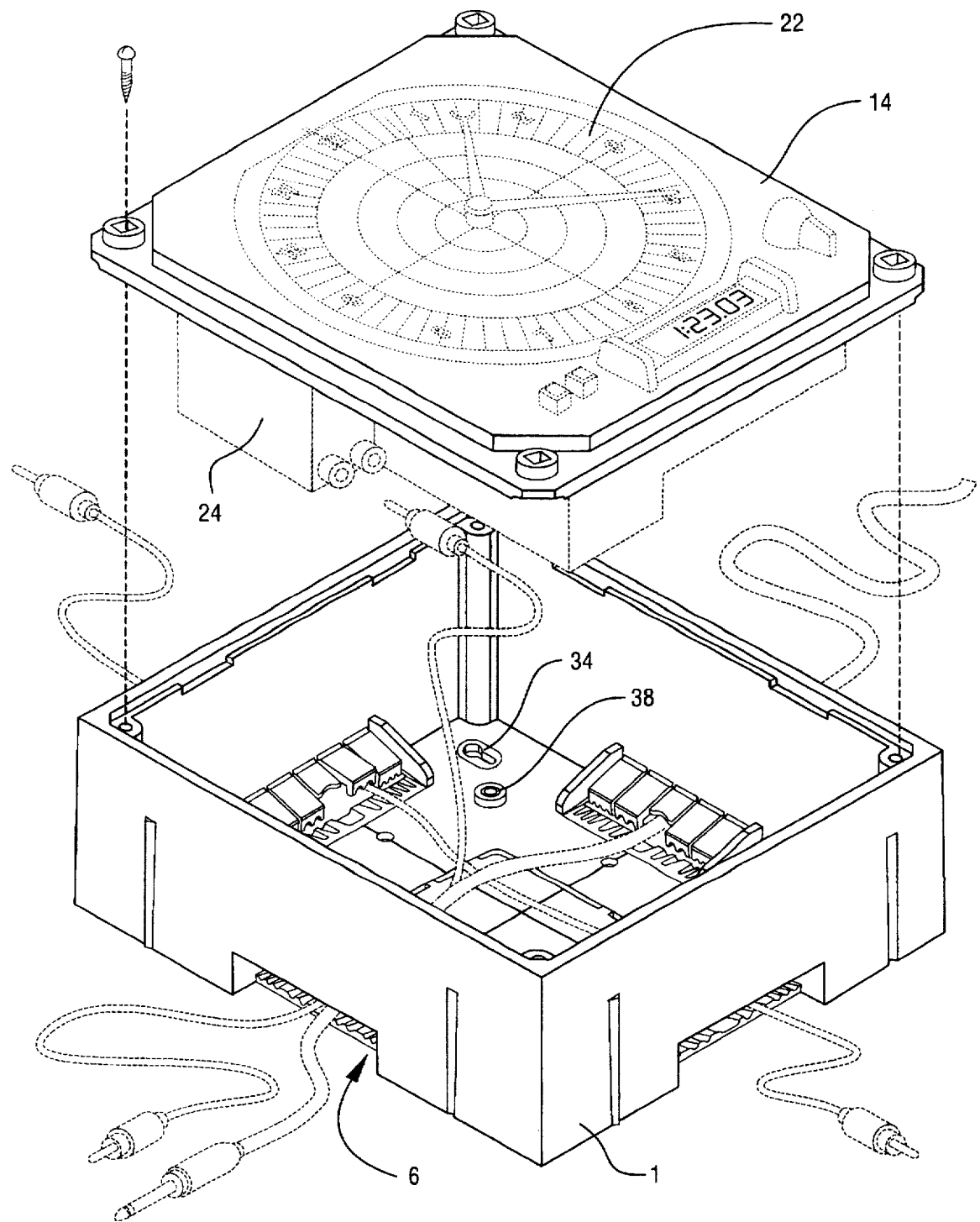
FIG. 2 is an isometric view of the preferred embodiment of the present invention shown herein with a clock unit mounted thereto.

It is presently envisioned that a variety of modifications can be incorporated within the faceplate cover 14 and utilized with the enclosure module 1 as described as part of the teachings of the present invention. For example, either ornamental or functional changes can be easily incorporated. Referring to FIG. 2, the present invention is depicted utilizing a faceplate cover 14 upon which is mounted a clock face 22 and clock mechanism 24. Clocks and clock technology are conventionally known and can be easily incorporated with the enclosure module 1 of the present invention. Similarly, but not shown, it is envisioned that other appliances can be similarly incorporated, including, but not limited to, clocks, radios, speakers, intercoms, emergency lighting, or smoke detectors. Additionally, an assembly comprising a combination of various appliances can be provided utilizing the interlocking capabilities of the common enclosure module 1 utilized to house each appliance. In such an assembly, cables can be routed between and interconnected among the various module enclosures by passing any cables through adjacent and aligned wireway openings 6.

Figure 4:
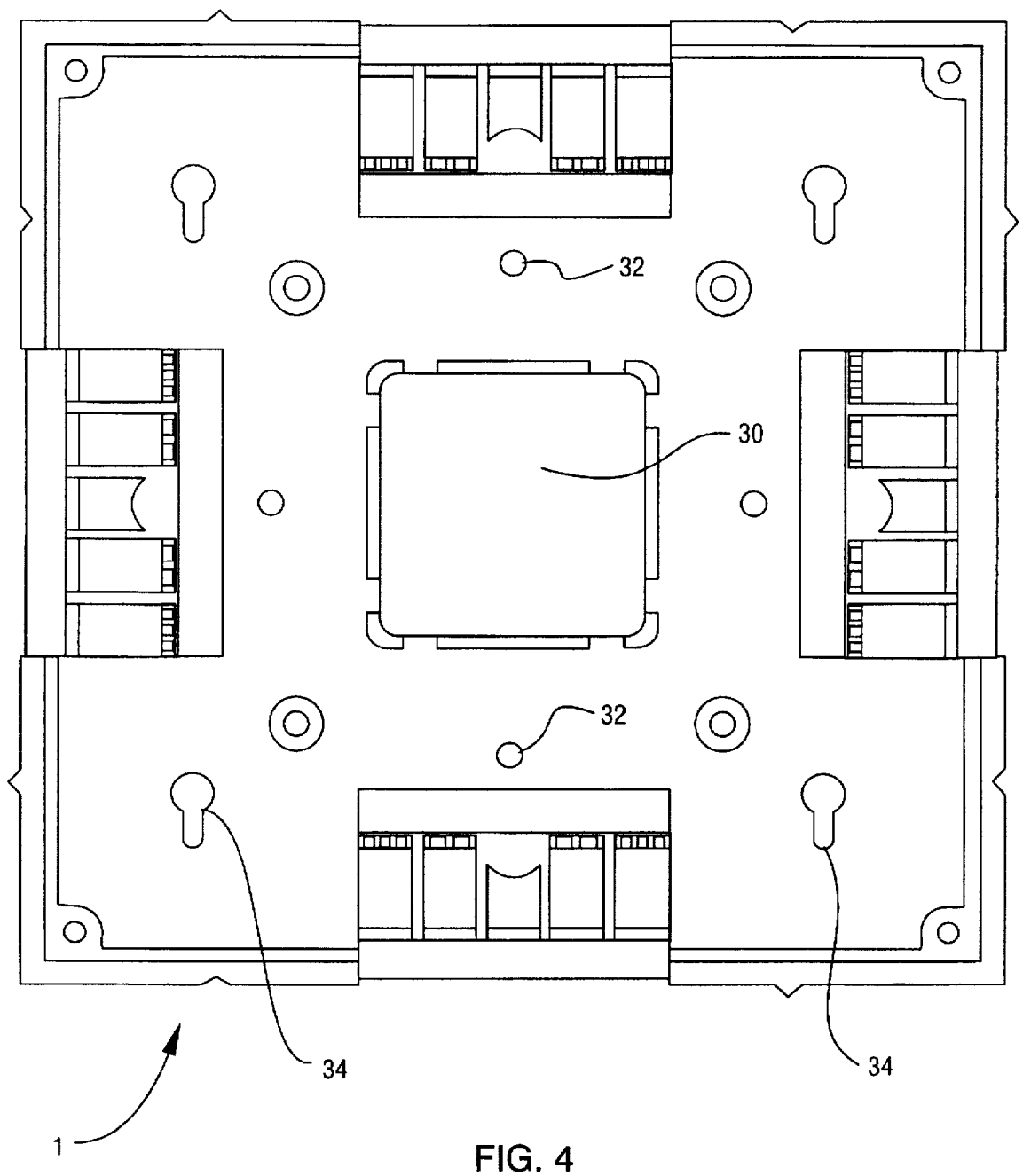
FIG. 4 is a bottom plan view thereof.

In addition to the interchangeablility and interconnectability of the enclosure modules 1, another important inventive aspect of the present invention includes the structures formed upon and supported by the bottom backplate 2. FIG. 3 shows more clearly the top view, and FIG. 4 the bottom view, of the enclosure module 1 itself. Due to the symmetric functionality of the enclosure module 1 which results in interchangeability and interconnectability at any orientation, the bottom backplate 2 is symmetric along both its linear vertical and linear horizontal axis. Located at the center is a square knock-out 30, formed in a manner conventional to conventionally used electrical junction boxes. Also, mounting holes 32 are aligned about the knock-out 30, and are spaced apart at a dimension standard to that of conventional electrical switch plate covers or electrical outlet covers (presently 2⅜ inches). It is felt that such a feature would allow the present invention to be more readily incorporated into conventional home electrical systems, or similarly more easily allow mounting to such available home structures. Alternately, mounting screw slots 34 (shown in FIG. 3 including a reinforcing ridge 36), are provided penetrating the backplate 2 in order to allow conventional affixing to a vertical surface utilizing nail or screw fasteners. Additionally, a plurality of circuit board mounting structures 38 are provided in a raised, offset manner above the bottom backplate surface 2 so as to provide a means of affixing circuit boards or other internal working components which support the appliance in a manner that does not otherwise interfere with the attachment of the enclosure module 1 to a wall or other vertical surface.

Finally, the detailed structure of the wireway opening 6 is best shown in FIG. 7 through FIG. 10. A configured wireway ramp 80 is formed along the bottom edge of the wireway opening 6 along the peripheral edge of the bottom backplate 2. Supporting a plurality of wire guiding grooves 82, the wireway ramp 80 opposes a plurality of extended wireway tabs 84 which are affixed to and extend inward and downward from the sidewall 4. Each wireway tab 84 has a corrugated lower edge which forms a plurality of wire guiding flutes 86. In such a configuration, cabling and wiring can be guided in an organized manner through the wireway opening 6 between the wireway ramp 80 and the wireway tabs 84. The cables or wires rest within the guiding grooves 82 and guiding flutes 86 to provide a flat and organized installation that resists slippage. Further, it is envisioned that at one extended wireway tab, herein shown as the center tab, would consist of a short center tab 88 which is aligned in an opposed manner with a prominent groove 89. Such a configuration provides an opening for allowing the passage of electrical plugs and cable jacks through the wireway opening 6. As such, standard appliance extension cords having premolded plugs can be utilized in conjunction with the present invention.

While the above description contains many specificities, these should not be construed as limitations on the scope of the invention, but rather as an example of the preferred embodiment thereof. Many other variations are possible within the spirit and scope of the present invention.

For example, in FIG. 12 an accessory tray 120 is shown mounted between the enclosure module 1 and a faceplate cover 14. The accessory tray 120 is envisioned as fittingly engaging within the enclosure module sidewalls 4, and having a plurality of alignment tabs 122 for mating within the accessory tray seat notches 16 described above. Such an embodiment allows for containment of appliance components in a manner physically isolated from contact with cabling passing from and through the wireway openings 6. It is also envisioned that a second center knock-out 124 would be provided in an otherwise conventional manner, similar to the knock-out 30 on the enclosure module backplate 6, in order to allow the option of providing limited passage from or access to the compartment formed between the accessory tray 120 and faceplate cover 14.

Yet another alternate embodiment varying that described by FIG. 12 is depicted in FIG. 13. In order to allow transitory access to the compartment formed between the accessory tray 120 and faceplate cover, a hinged faceplate cover 130 can be used in place of a generic faceplate cover 14. Having a door 132 hinged in a rotating manner to a frame 134 by a hinge means 136, access can be gained to the formed compartment.

Similarly, many changes and variations in the faceplate cover 14 can be incorporated and allowed for use in conjunction with the present invention. By way of additional example and not for means of limitation, FIG. 14 depicts an adjustable surface mounted clamping means 140 which can be included with a frame 142 which additionally and/or alternately can be affixed to any typical enclosure module. A plurality of clamping arms 144, of various sizes and shapes, can be movably placed in an impinging fashion between the frame 142 and a frame support 147. A first gripping means 145, shown as a plurality of equilinear detentes extending downward from the bottom of each clamping arm 144 align with a second gripping means 146, herein shown as a similarly formed plurality of equilinear detentes extending upward form the top of the frame support 144. The clamping arms 144 can then be slidably adjusted along various guidance tracks 148 formed within the frame 142 by the respective detentes interlocking between each other in an alternating manner. As shown in FIG. 14a, an assembled adjustable surface mounted clamping means 140 can be utilized for any number of holding functions when mounted to an enclosure module, and can itself form part of a very diverse yet integrated system of modular and interlocking component or appliance housings.

The foregoing description is included to illustrate the operation of the preferred embodiment and is not meant to limit the scope of the invention. The scope of the invention is to be limited only by the following claims.

What is claimed is:

1. A modular, interchangeable appliance housing comprising:

an enclosure module, said module having a square shape and having a bottom backplate circumscribed at its perimeter by four identical sidewalls extending outward therefrom, each of said four identical sidewalls forming a wireway opening at a point about a central axis of said module;

a vertically placed alignment boss affixed to each of said four identical sidewalls to a side of the central axis of said module;

an alignment slot formed of an equal height with said alignment boss within each sidewall and symmetrically opposed to said alignment boss to the one side of said central axis of said module;

a faceplate cover for fitting over, covering, and sealing said enclosure module and forming a rigid barrier covering an internal volume of the enclosure module when in place, said faceplate cover further having a back side supporting an engaging ridge for aligning along a faceplate seat in a sealing manner; and a faceplate seat formed along an inner edge of of each of said sidewall for receiving in a fitting manner said faceplate cover, wherein said faceplate seat further comprises a plurality of accessory tray seat notches recessed within said faceplate seat for receiving and containing an accessory tray.

2. The modular, interchangeable appliance housing as described in claim 1, further comprising:

an accessory tray.

3. The modular, interchangeable appliance housing of claim 1, further comprising:

mounting screw slots penetrating said backplate.

4. The modular, interchangeable appliance housing of claim 1, further comprising:

a plurality of circuit board mounting structures formed in a raised, offset manner above the bottom backplate surface so as to provide a means of affixing circuit boards or other internal working components in a manner that does not otherwise interfere with the attachment of the enclosure module to a wall or other vertical surface.

5. A modular, interchangeable appliance housing comprising:

an enclosure module, said module having a square shape and having a bottom backplate circumscribed at its perimeter by four identical sidewalls extending outward therefrom, each of said four identical sidewalls having a top edge and further forming a wireway opening at a point about a central axis of said module, wherein said wireway opening comprises a configured wireway ramp formed along a bottom edge of said wireway opening along a peripheral edge of the bottom backplate, said wireway ramp forming a plurality of wire guiding grooves, and a plurality of extended wireway tabs which are affixed to and extend inward and downward from said sidewall opposing said wireway ramp;

a shallow, vertically placed alignment boss affixed to each of said four identical sidewall to a side of a central axis of said sidewall; and a shallow alignment slot formed of an equal height with said alignment boss within each sidewall and symmetrically opposed to said alignment boss to the one side of the central axis of said sidewall;

a faceplate cover for fitting over, covering, and sealing the upper opening of said enclosure module and forming a rigid barrier covering the internal volume of the enclosure module when in place, said faceplate cover further having a back side supporting an engaging ridge for aligning along a faceplate seat in a sealing manner; and a faceplate seat formed along an inner edge of said top edge of each sidewall for receiving in a fitting manner said faceplate cover.

6. The modular, interchangeable appliance housing of claim 5, wherein each said wireway tab has a corrugated lower edge which formes a plurality of wire guiding flutes allowing to guide each cable and wire through a designated said wireway opening between said wireway ramp and said wireway tab.

7. The modular, interchangeable appliance housing as described in claim 6, including a center wireway tab comprising a shortened center tab which is aligned in an opposed manner with a prominent groove there by providing an opening for allowing the access of electrical plugs and cable jacks through said wireway opening.

* * * * *